United States Patent [19]

Peng

[11] Patent Number: 5,488,363

[45] Date of Patent: Jan. 30, 1996

[54] DIRECTION CODE FOR ENCODING CHINESE CHARACTERS USING ENGLISH ALPHABET AND INPUTTING METHOD THEREOF

[76] Inventor: Jingmin Peng, 18 Dagaoshan Road, Chengnan, Changde City, Hunan Province, China

[21] Appl. No.: 195,342

[22] Filed: Feb. 9, 1994

[30] Foreign Application Priority Data

Mar. 3, 1993 [CN] China .............................. 93 1 10607.9
Aug. 30, 1993 [CN] China .............................. 93 1 16696.9
Dec. 15, 1993 [CN] China .............................. 93 1 20028.8

[51] Int. Cl.$^6$ ................................................ H03K 17/94
[52] U.S. Cl. ............................ 341/28; 341/22; 400/109; 400/110
[58] Field of Search ................................ 341/22, 28, 25; 400/110, 109, 111, 486; 364/419

[56] References Cited

U.S. PATENT DOCUMENTS

| | | | |
|---|---|---|---|
| 4,684,926 | 8/1987 | Yong-Min | 341/28 |
| 4,949,260 | 8/1990 | Hsu | 364/419 |
| 4,954,955 | 9/1990 | Chiu | 400/110 |
| 5,109,352 | 4/1992 | O'Dell | 400/110 |
| 5,119,296 | 6/1992 | Zheng et al. | 364/419 |
| 5,187,480 | 2/1993 | Thomas et al. | 341/22 |
| 5,212,638 | 5/1993 | Bernath | 364/419 |

*Primary Examiner*—Brent A. Swarthout
*Assistant Examiner*—Ashok Mannava
*Attorney, Agent, or Firm*—Ladas & Parry

[57] ABSTRACT

The present invention relates to the direction code for encoding Chinese characters using English alphabet and the inputting method thereof. While encoding a Chinese character, constructing the English letters that exist in said character according to horizontal stroke "—", vertical stroke "|", left-slanting stroke "╱" and right-slanting stroke "╲" of Chinese characters, decomposing said character into a combination of certain actual postures among 161 ones of the letters according to order of strokes and rules of the order of strokes, said combination of postures being limited to 6 direction patterns, said letters being in 8 positive directions and 8 inverted directions presented by the letters respectively, said combination of the letters being the direction code of said Chinese character.

6 Claims, 8 Drawing Sheets

DIRECTION CODE FOR ENCODING CHINESE CHARACTERS USING ENGLISH ALPHABET AND INPUTTING METHOD THEREOF

FIELD OF THE INVENTION

The present invention generally relates to a Chinese character encoding and inputting method, and particularly to the direction code for encoding Chinese characters using English alphabet and the inputting method thereof.

BACKGROUND OF THE INVENTION

Up to now, more than 700 encoding systems have been disclosed for inputting Chinese characters. However, in these systems, Chinese characters are not encoded directly using English alphabet. Thus it is still inconvenient to input and output Chinese characters into and from computers like alphabetic languages and to use Chinese characters in communication facilities and automatic printing systems.

Among the prior art methods, five-stroke encoding system invented by Wang Yong Min is suitable to standard keyboard, with only a few duplicate codes. However, the operators have to master 125 radicals and 25 pithy formulas defined by the inventor. And this makes non-typists shrink back at the sight of the great amount of what have to be memorized. This defect is due to the fact that the method is soly based on character forms.

With the "full-information" code invented by Du Bing Chan, an operator also has to remember 100 radicals in common use and 8 first pronounceable letters of 8 strokes. It is difficult to solve the problem of alphabetizing Chinese characters by just concerning the similar pronunciation between Chinese characters and alphabetic language, regardless of character forms. Owing to many dialects and slangs, the above method is hard to be popularized.

Although Chen Ai Wen, the inventor of "Biao Xing" (indicating form) code, discovered that there obviously exist a few letters of English alphabet in Chinese characters, he did not find this objective law: all Chinese characters are formed by letters of English alphabet piled up like toy bricks. Thus, he adopted the method for inputting Chinese characters by means of the mixture of four kinds of information associated with phonetic alphabet, numerals, component radicals and stroke blocks similar to letters, and a few letters of English alphabet to input Chinese characters in conventional way. Thus users have to memorize a lot of rules.

SUMMARY OF THE INVENTION

Accordingly, it is the object of the present invention to provide a method for encoding Chinese characters using English alphabet. The code formed with the above method is called "Direction Code".

The inventor bases his invention on such a theory that Chinese characters are of alphabetic writing. According to this theory, each Chinese character is regarded as a combination of some English letters in 42 states in which the letters are in different directions. The direction codes of Chinese characters are obtained by steps of:

constructing the letters of English alphabet that objectively exist in Chinese characters according to horizontal stroke "——", vertical stroke "|", left-slanting stroke "╱" and right-slanting stroke "╲" of Chinese characters, decomposing Chinese characters into combinations of certain actual postures among 161 ones of the letters according to order of strokes and rules of the order of strokes, said combinations of postures being limited to 6 direction patterns, said letters being in 8 positive directions and 8 inverted ones presented by the letters respectively;

said combinations of the letters being the direction codes of the Chinese characters encoded.

Finally, these codes are stored in the memory of a computer. With the help of appropriate software, Chinese characters can be input by entering some combinations of English letters. Specifically, an external code according to the present invention is a ACSII string of 4 bytes. If the length of the code is less than 4 bytes, the code is followed by a space. An internal code according to the present invention is a compressed binary bit string of 3 bytes. Every element of an external code corresponds to 5 bits of an internal code. The distribution of the external codes is arranged according to the frequency of the characters appeared in daily use, phrases, and characters defined by the users.

The English letters adopted in the present invention have 42 states:

(a) 26 positive capital letters, including A, B, C, D, E, F, G, H, I, J,K,L,M, N, O,P,Q,R,S,T,U,V,W,X,Y and Z;

(b) 8 positive small letters, including b, f, g, h, i, r, t and y;

(c) 4 inverted capital letters corresponding to 4 positive capital letters F, G, Q and S, including ⌐, ⊂, ◌ and ⌐;

(d) 4 inverted small letters corresponding to 4 positive small letters h, n, r and y, including μ, ∪, ∟ and ⋋.

The following rules of the order of strokes are used:

(a) get a letter directly;

(b) horizontal first, and then vertical;

(c) left-slanting first, and then right-slanting;

(d) from left to right;

(e) from left to middle, and then right;

(f) from top left, top middle, top right to bottom left, bottom middle, bottom right;

(g) from top to bottom;

(h) from top to middle, and then bottom;

(i) from left top, left middle, left bottom to right top, right middle, right bottom;

(j) from outside to inside;

(k) from outside to inside, and then seal;

(l) from left top to right bottom;

(m) from right top to left bottom;

(n) from middle to both sides.

The inputting method of Chinese characters according to the present invention has the following features and effects:

1. It is the full information, which exist definitely and objectively in Chinese characters, such as the five elements including strokes, variable letters of English alphabet constructed with strokes, directions of letters, the order of strokes, and direction patterns, that is developed and utilized in the present invention, but not only one-sided information, such as character forms, or character pronunciation, or character angles.

2. The present invention discloses the reality that Chinese characters are composed of 161 different postures of the letters of English alphabet. That is, Chinese characters are constructed with letters of English alphabet directly. This is advantageous to the application of Chinese characters in computers, as alphabetic writing in block form.

3. With the method according to the present invention, Chinese characters are input via a standard keyboard, with low rate of duplicate codes.

For a fuller understanding of the nature and advantages of the present invention, reference should be made to the following detailed description taken in conjunction with the accompanying drawings.

DETAILED DESCRIPTION OF THE INVENTION

Figure 1A:
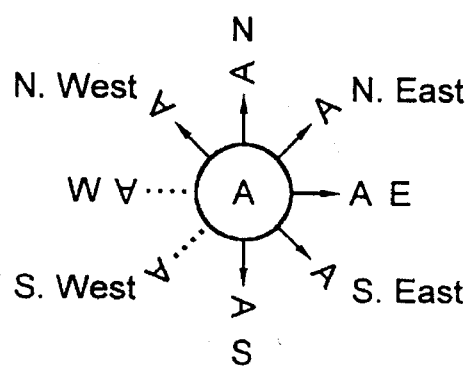
FIGS. 1(a) to 1(z) show the direction postures of 26 positive capital letters A, B, C, . . . , Z in 8 directions, which are used in the inputting method of Chinese characters according to the present invention.
Figure 1B:
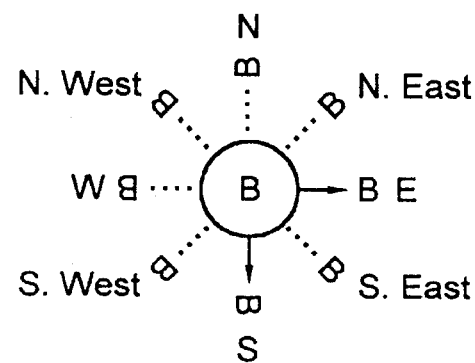
Figure 1C:
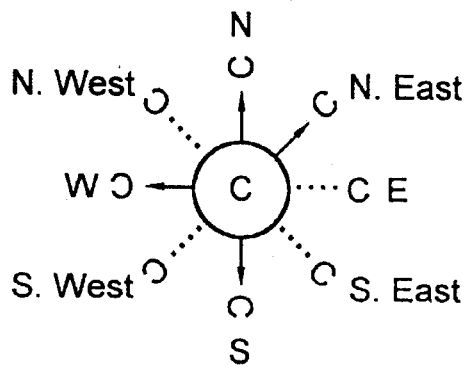
Figure 1D:
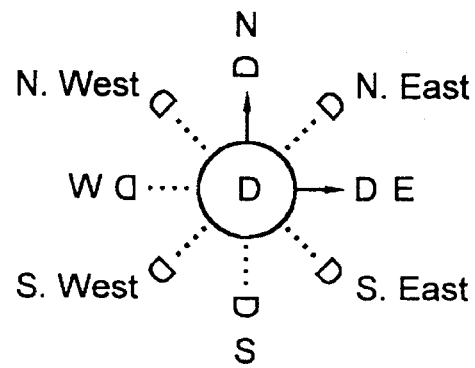

The present invention is described by way of detailed examples and in the order of strokes in calligraphy.

1. The relationship among the pastures, direction patterns and directions of letters in Chinese characters and the corresponding appearance Though there are about 60 thousand characters in Chinese language, only less than 8 thousand of them are frequently used. There may be 336 postures of the letters which objectively exist in the thousands of frequently-used characters (42 states * 8 directions). However, the inventor discovered that only 161 not 336 postures, as shown by bold arrows in FIGS. 1(a) to 1(z) , 2(a) to 2(h), 3(a) to 3(d) and 4(a) to 4(d), appear in the strokes of these characters. The combinations of these postures are limited to 6 direction patterns, namely, east, south, west, north, mixed, as well as mixed and changed directions.

b 2.Examples of encoding characters according to the order of strokes (a) Get a letter directly. For example, 日 corresponds to the letter "B"

尺 corresponds to the letter "R"

山 corresponds to the letter "E"

(b) Horizontal first, and then vertical. For example,

干 is constructed with "一十" corresponding to the letters "IX"

(c) Left-slanting first, and then right-slanting. For example,

八 is constructed with "八" corresponding to the letters "JL"

(d) From left to right. For example,

仆 is constructed with "仆" corresponding to the letters "RR"

(e) From left to middle and then right. For example,

洲 is construceted with "洲" corresponding to the letters "FTCJ"

(f) From top left, top middle, top right to bottom left, bottom middle, bottom right. For example, the top of 巢 is constructed with "⟨ ⟨ ⟨" corresponding to the letters "VVV"

the bottom of 忍 is constructed with "╱ ╰ ╲" corresponding to the letters "JEJ"

(g) From top to bottom. For example,

岂 is constructed with "山己" corresponding to the letters "ES"

(h) From top to middle, and then bottom. For example,

吉 is constructed with "十一口" corresponding to the letters "XIO"

吝 is constructed with "亠 X 口" corresponding to the letters "YXO"

(i) From left top, left middle, left bottom to right top, right middle, right bottom. For example, the left of 理 is constructed with "一十／" corresponding to the letters "IXJ"

the right of 须 is constructed with "丆冂人" corresponding to the letters "RUR"

(j) From outside to inside. For example,

冈 is constructed with "冂X" corresponding to the letters "CX"

巨 is constructed with "匚⊐" corresponding to the letters "UU"

(k) From outside to inside, and then seal. For example,

且 is constructed with "冂＿＿＿" corresponding to the letters "UIII"

回 is constructed with "冂口一" corresponding to the letters "UOI"

(l) From left top to right bottom. For example.

尼 is constructed with "尸／L" corresponding to the letters "PJL"

歹 is constructed with "⊤ヲ" corresponding to the letters "RA"

(m) From right top to left bottom. For example,

氪 is constructed with "⌐乀八ㄋノ" corresponding to the letters "KZVJJ"

巴 is constructed with "D L" corresponding to the letters "DL"

(n) From middle to both sides. For example,

小 is constructed with "小" corresponding to the letters "AJ"

While decomposing characters in accordance with the order of strokes, the user should take the letter constructed with as many strokes as possible at each step. For instance, "金" should be decomposed into "人十ソ" corresponding to "AXK", but not "人一十ソ" corresponding to "VIXK", or "人一十∨ —" corresponding to "VIXVI".

Figure 5:
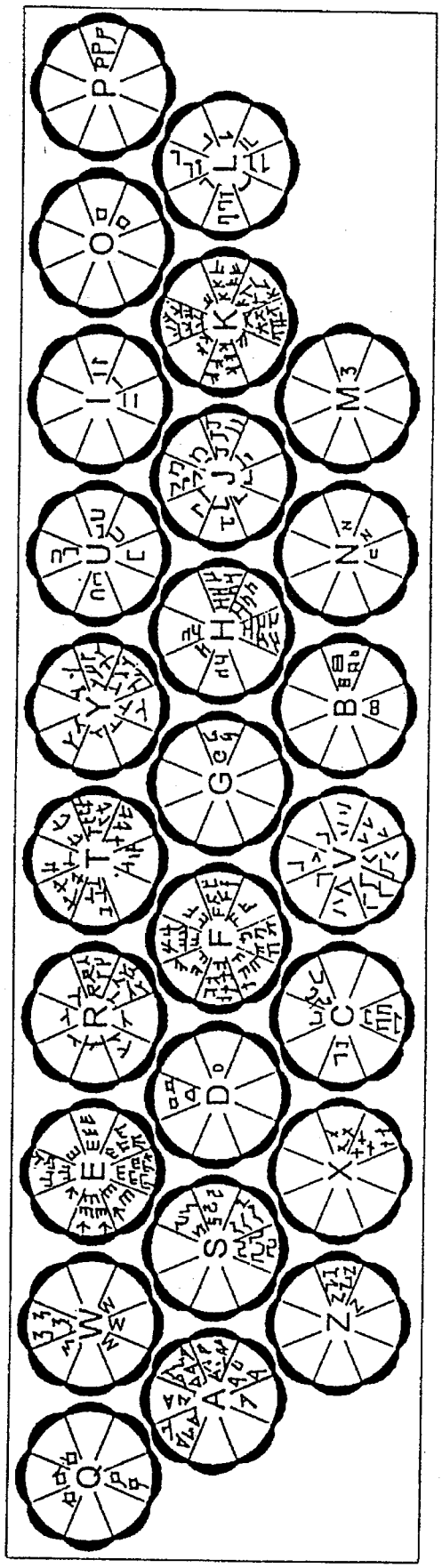
FIG. 5 shows the correspondence between the 42 states of the letters used in the present invention and the keys on the standard English keyboard.

3. Examples of the correspondence relationship between 42 states of letters in different directions and the keys on the standard keyboard The correspondence relationship is illustrated in FIG. 5 and given in Table-1, inwhich letters in [ ] are in east direction, corresponding to 26 letter keys on the keyboard respectively; those in ( ) are the variable forms of the letters in all direction (1) From left top to right bottom. For example, 尼 is constructed with "尸丿L" corresponding to the letters "PJL"

歹 is constructed with "歹夕" corresponding to the letters "RA"

(m) From right top to left bottom. For example,

氘 is constructed with "⺧乁八⁊丿" corresponding to the letters "KZVJJ"

巴 is constructed with "𠃊L" corresponding to the letters "DL"

(n) From middle to both sides. For example,

小 is constructed with "亅丿 丶" corresponding to the letters "AJ"

While decomposing characters in accordance with the order of strokes, the user should take the letter constructed with as many strokes as possible at each step. For instance, "金" should be decomposed into "人十丷" corresponding to "AXK", but not "人一十丷" corresponding to "VIXK", or "人一十丿一" corresponding to "VIXVI".

3. Examples of the correspondence relationship between 42 states of letters in different directions and the keys on the standard keyboard The correspondence relationship is illustrated in Figure 5 and given in Table—1, inwhich letters in [ ] are in east direction, corresponding to 26 letter keys on the keyboard respectively;

those in ( ) are the variable forms of the letters in all direction

Table—1

[A]( A ↗ ⼌ 丿 ⼹ ㇂ ㇉ 𠃊 ㄏ ▽ ⼂ ⺌ ⼧ ⼇ ⼉ ⼊ ⼧ 𠂆 ㄐ 𠆢 ⼛ ⺀ ㄚ )

[P] 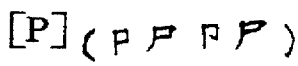
[Q] 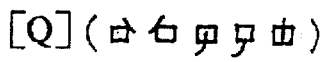
[R] 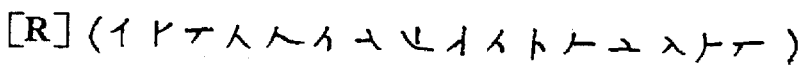
[S] 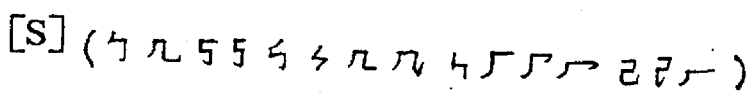
[T] 
[U] 
[V] 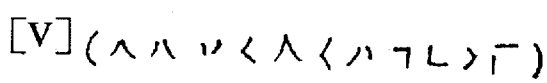
[W] 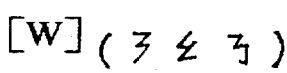
[X] 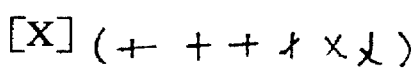
[Y] 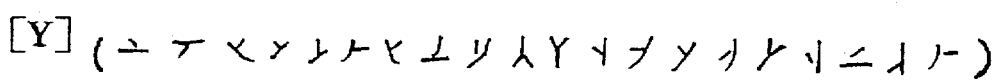
[Z] 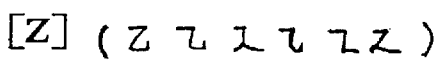
In the following description, a "step" means an angle of 90 degrees.
(a) Letters in east direction and characters which can be spun to correspond to the keys on the keyboard
Chinese character                  keys on the keyboard

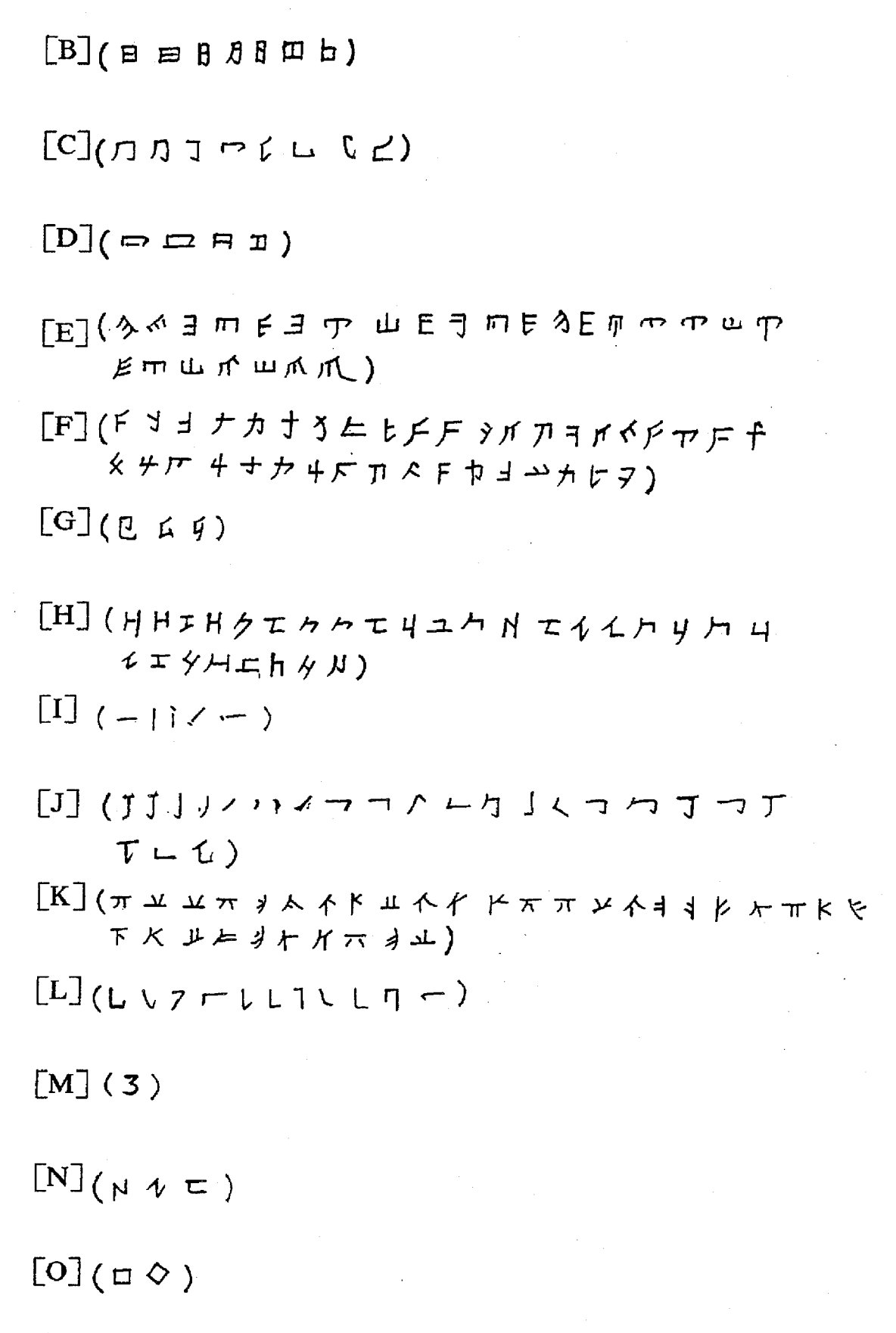

[B] (◲ ◱ ◳ ◰ ⊞ ḅ)

[C] (⊓ ⊓ ⊐ ⊏ ⊏ ⊏ ⊏)

[D] (⊏⊐ ⊏⊐ ꟻ ⊐)

[E] (⋺ ⋻ ∃ ⊓ ⴺ ⋺ ⊔ ∃ ⊐ ⊓ ∃ ⋺ ⊓ ⋺ ⊓ ⊔ ⊓
   ⴺ ⊓ ⊔ ⋀ ⊔ ⋀)

[F] (ꟻ ⋺ ⋺ ꟻ ⋺ ⊣ ⋺ ꟻ ⋺ ꟻ ꟻ ⋺ ⋺ ꟻ ⋺ ⋺ ⊓ ꟻ ⋺ ⋺ ꟻ ꟻ
   ⋏ ⋏ ⊓ ⋏ ⋏ ⋏ ⋏ ⋏ ⋏ ⊓ ⋏ ꟻ ⋏ ⋏ ⋏ ⋺)

[G] (𐌁 ⋏ 𝟿)

[H] (ᕼ ᕼ ꘎ ᕼ ⋋ ⊥ ⋏ ⋏ ⊥ ⋎ ⋏ ⋏ ᴎ ⊥ ⋌ ⋌ ⋏ ⋎ ⋏ ⋎
   ⋌ ꘎ ⋎ ᕼ ꘎ ʰ ⋎ ᴎ)

[I] (— | ̇ ⸗ ⸺)

[J] (ꞱꞱ ꞱꞱ⸝⸝⸝⸜ ⸜⸝⸜⸜⸜⸜⸜⸜⸜ ⸜⸜⸜⸜⸜⸜
   ꞱꞱꞱ)

[K] (π ⊥ ⊥ π ⋡ ⋏ ⋏ ⊥ ⋏ ⋏ ⋏ π ⋏ ⋏ π ⋠ ⋠ ⋠ ⋏ ⋏ π κ ⋠
   ꞮꞮ ⋏ ⊥ ⊥ ⋏ ⋏ ⋏ π ⋠ ⊥)

[L] (⌊ ⋎ ⊐ ⊏ ⌊ ⌊ ⌐ ⋎ ⌊ ⋀ ⸺)

[M] (Ɛ)

[N] (ᴎ ⋎ ⊏)

[O] (□ ◇)

In the following description, a "step" means an angle of 90 degrees.

(a) Letters in east direction and characters which can be spun to correspond to the keys on the keyboard

| Chinese character | keys on the keyboard |
|---|---|
| 乂 get a letter directly | X |
| 口 get a letter directly | O |
| 合 get a letter directly | AO |

Note: These characters and the corresponding letters are in the regular directions. The user can enter the keys directly without spinning the corresponding letters. The characters themselves are in east direction as shown respectively in FIGS. 1(x), 1(o) and 1(a).

(b) Letters in south direction and characters which can be spun to correspond to the keys on the keyboard

| Chinese character | Steps of spinning | Keys on the keyboard |
|---|---|---|
| 工 | counterclockwise spun by 1 step | H |
| 丁 | counterclockwise spun by 1 step | I |
| 巢 | counterclockwise spun by 1 step | V |
| 区 | counterclockwise spun by 1 step | U |

Note: The letters represented by bold lines in the characters can be counter clockwise spun by 1 step to correspond to the keys in east direction. The bold parts in the characters are the letters in south direction referring respectively to FIGS. 1(h), 1(i), 1(m), 1(v) and 1(u).

(c) Letters in west direction and characters which can be spun to correspond to the keys on the keyboard

| Chinese character | Steps of spinning | Keys on the keyboard |
|---|---|---|
| 将 | clockwise spun by 2 steps | K |
| 归 | clockwise spun by 2 steps | E |
| 片 | clockwise spun by 2 steps | L |

Note: The letters represented by bold lines in the characters can be clockwise spun by 2 steps to correspond to the keys in east direction. The bold parts in the characters are the letters in west direction as shown respectively in FIGS. 1(k), 1(e) and 1(l).

(d) Letters in north direction and characters which can be spun to correspond to the keys on the keyboard

| Chinese character | Steps of spinning | Keys on the keyboard |
|---|---|---|
| 山 | clockwise spun by 1 step | E |

Figure 1E:
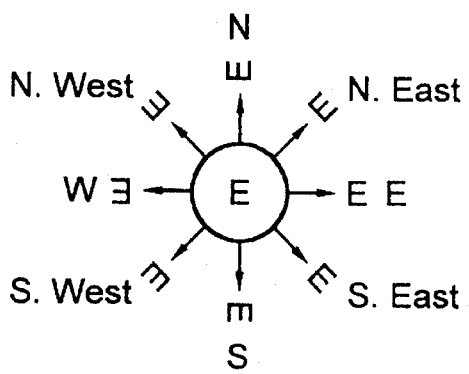
Figure 1F:
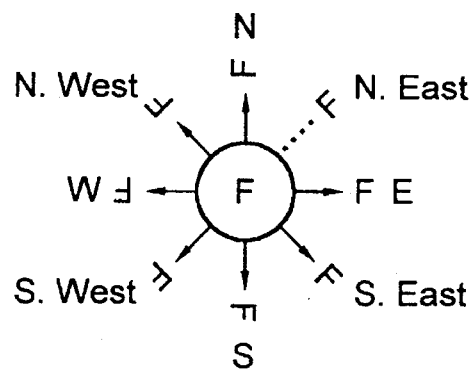
Figure 1G:
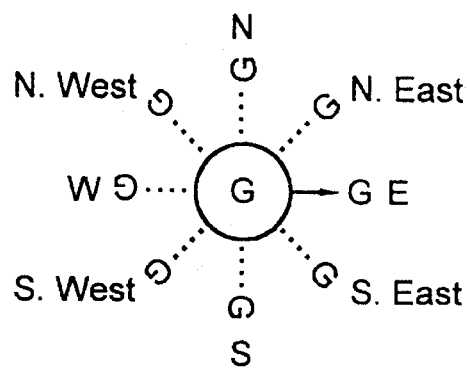
Figure 1H:
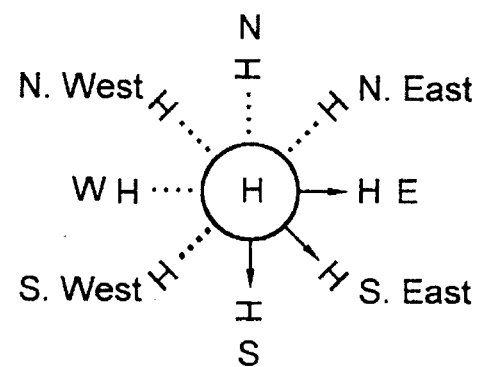
Figure 1I:
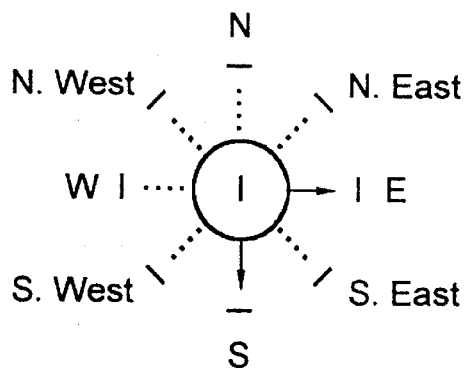

Note: The letters represented by bold lines in the characters can be clockwise spun by 1 steps to correspond to the keys in east direction. The bold parts in the characters are the letters in north direction as shown in FIG. 1(e).

(e) Letters in southeast direction and characters which can be spun to correspond to the keys on the keyboard

| Chinese character | Steps of spinning | Keys on the keyboard |
|---|---|---|
| 登 | counterclockwise spun by a half step | A |

Note: The letters represented by bold lines in the characters can be counterclockwise spun by a half step to correspond to the keys in east direction. The bold parts in the characters are the letters in southeast direction as shown in FIG. 1(a).

(f) Letters in southwest direction and the characters which can be spun to correspond to the keys on the keyboard

| Chinese character | Steps of spinning | Keys on the keyboard |
|---|---|---|
| 水 | counterclockwise spun by 1 and a half steps | J |
| 参 | counterclockwise spun by 1 and a half steps | E |

Figure 1J:
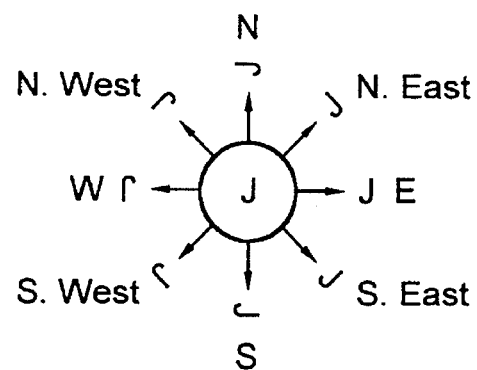

Note: The letters represented by bold lines in the characters can be counterclockwise spun by one and a half steps to correspond to the keys in east direction. The bold parts in the characters are the letters in southwest direction as shown respectively in FIGS. 1(j) and 1(e).

(g) Letters in northwest direction and characters which can be spun to correspond to the keys on the keyboard

| Chinese character | Steps of spinning | Keys on the keyboard |
|---|---|---|
| 汉 | counterclockwise spun by 2 and a half steps | T |
| 汉 | counterclockwise spun by 2 and a half steps | F |

Note: The letters represented by bold lines in the characters can be counterclockwise spun by two and a half steps to correspond to the keys in east direction. The bold parts in the characters are the letters in northwest direction as shown respectively in FIGS. 1(t) and 3(a).

(h) Letters in northeast direction and characters which can be spun to correspond to the keys on the keyboard

| Chinese character | Steps of spinning | Keys on the keyboard |
|---|---|---|
| 登 | counterclockwise spun by 3 and a half steps | K |
| 长 | counterclockwise spun by 3 and a half steps | K |

Figure 1K:
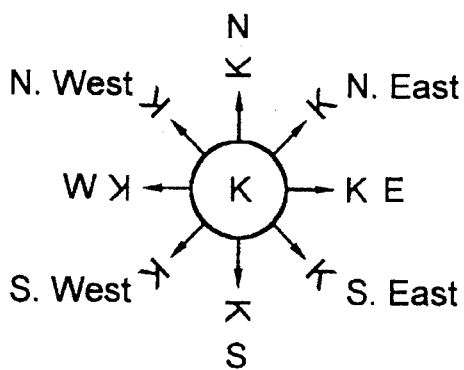
Figure 1L:
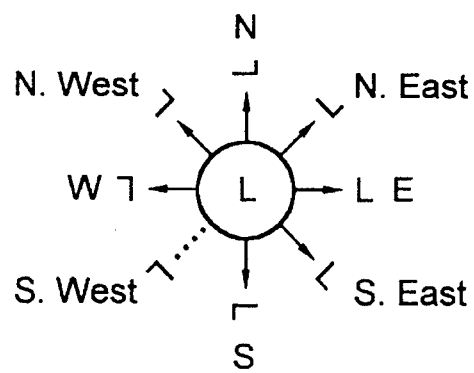
Figure 1M:
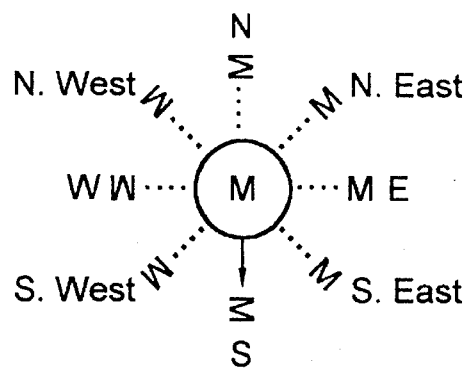
Figure 1N:
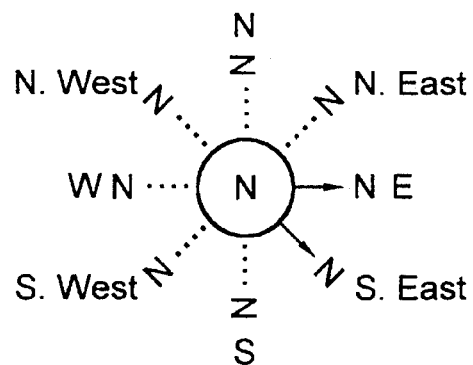
Figure 1O:
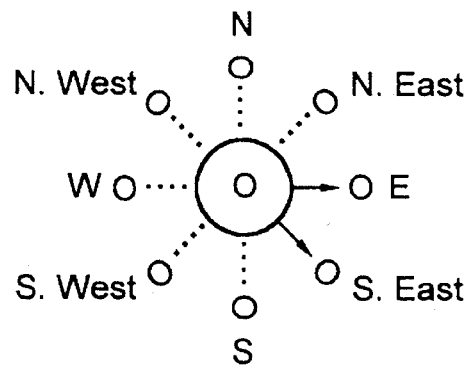
Figure 1P:
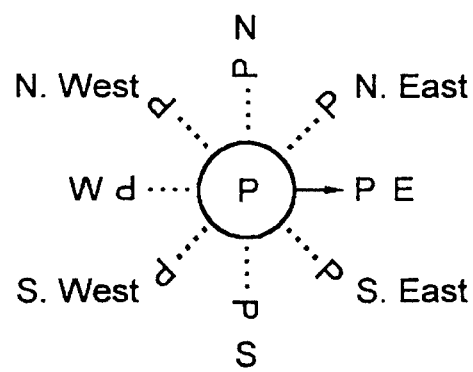
Figure 1Q:
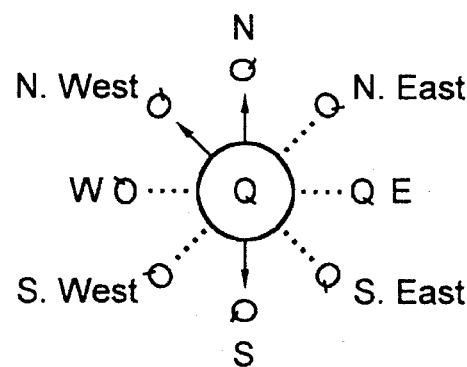

Note: The letters represented by bold lines in the characters can be counterclockwise spun by three and a half steps to correspond to the keys in east direction. The bold parts in the characters are the letters in northeast direction as shown in FIG. 1(k).

4. Six direction patterns formed by directions of letters which are got by taking Chinese characters apart in accordance with the order of strokes (a) Characters of east direction pattern

| Chinese character | Keys on the keyboard | Direction pattern |
|---|---|---|
| 尺 | R | east |
| 凶 | XU | east |

Figure 1R:
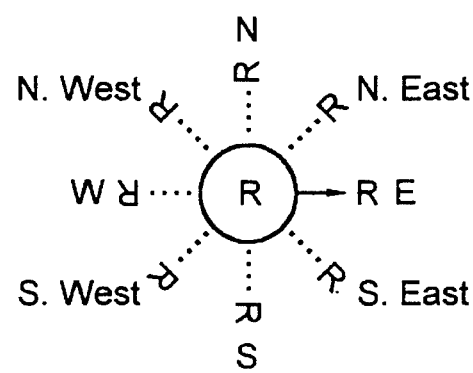
Figure 1S:
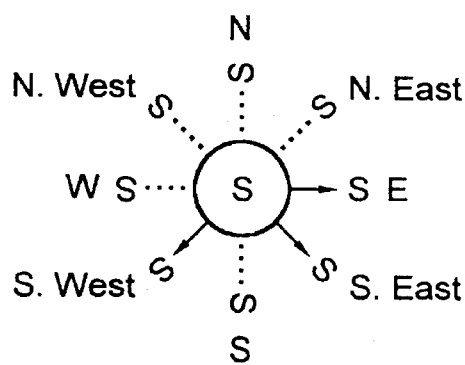
Figure 1T:
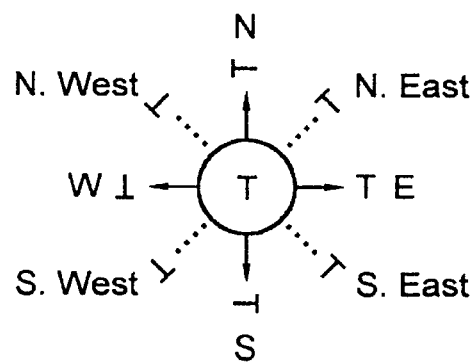
Figure 1U:
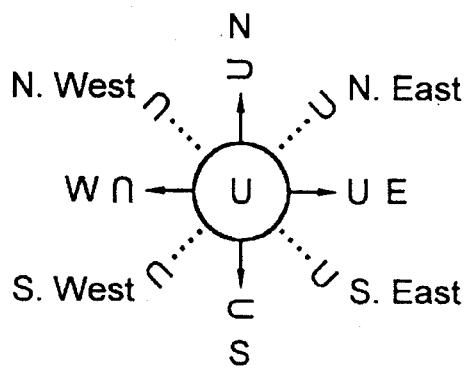
Figure 1V:
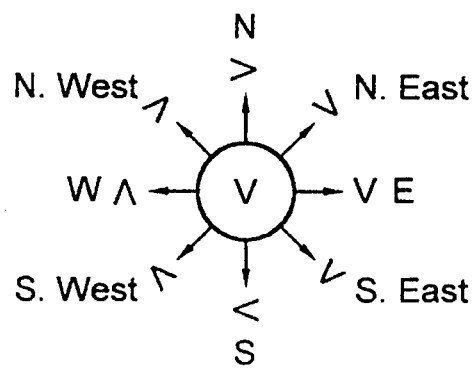
Figure 1W:
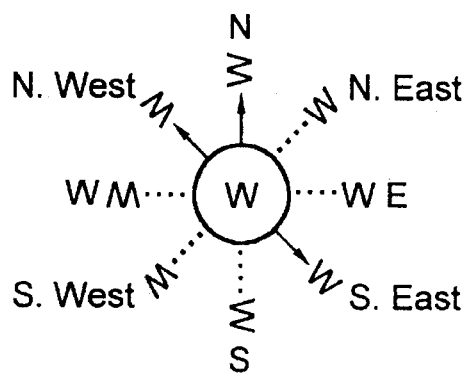
Figure 1X:
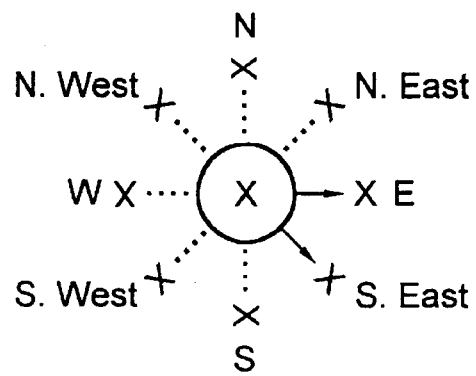
Figure 1Y:
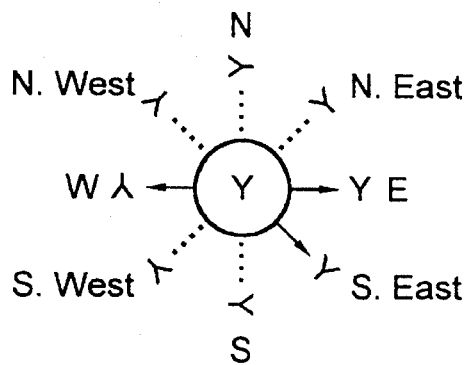
Figure 1Z:
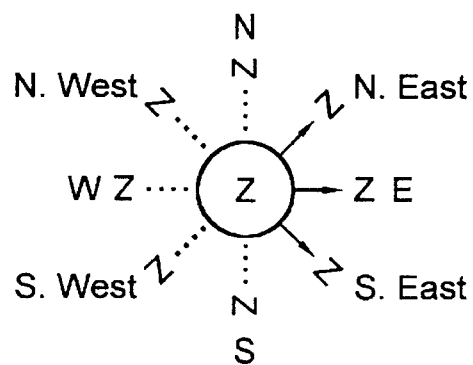
Figure 2A:
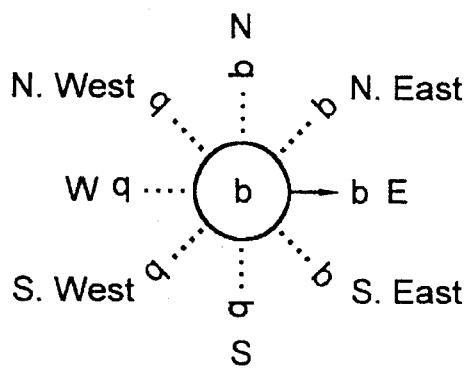
FIGS. 2(a) to 2(h) show the direction postures of 8 positive small letters b, f, g, h, i, r, t, y in 8 directions, which are used in the inputting method of Chinese characters according to the present invention.
Figure 2B:
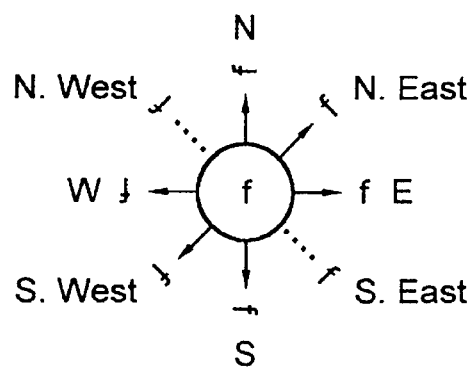
Figure 2C:
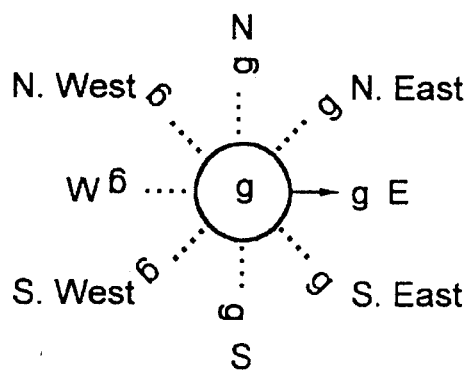
Figure 2D:
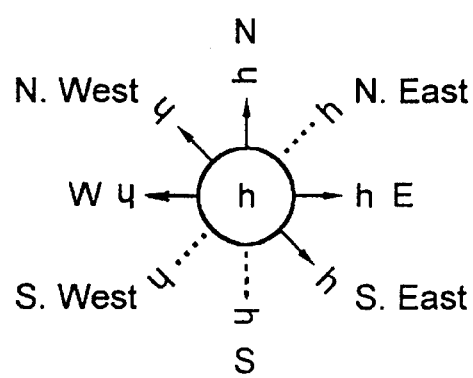
Figure 2E:
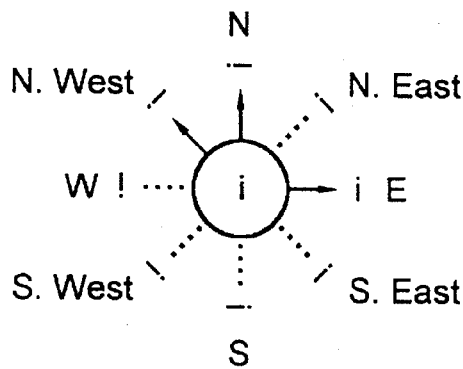
Figure 2F:
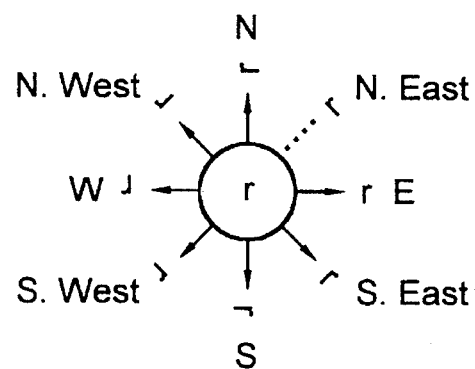
Figure 2G:
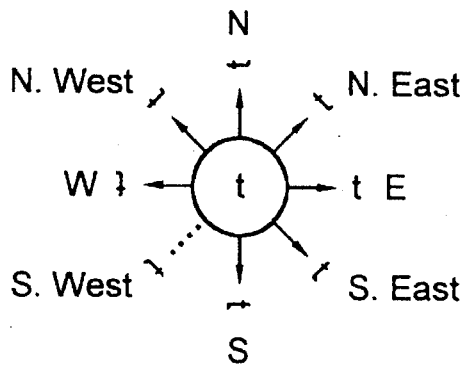
Figure 2H:
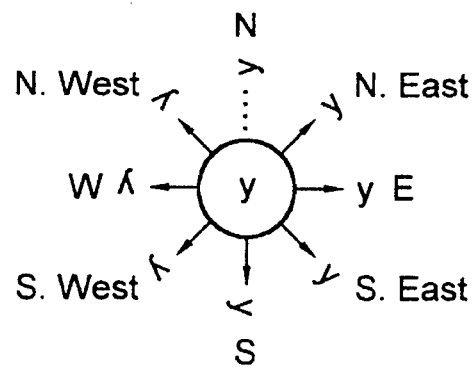
Figure 3A:
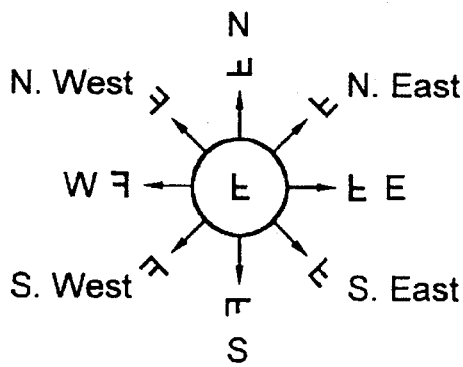
FIGS. 3(a) to 3(d) show the direction postures of 4 inverted capital letter; ⌐, ⌐, ⌐ and ⌐ in 8 directions which are used in the inputting method of Chinese characters according to the present invention.
Figure 3B:
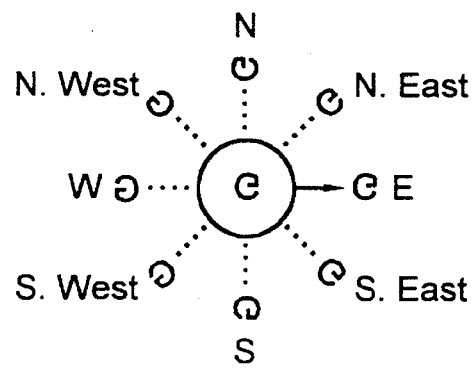
Figure 3C:
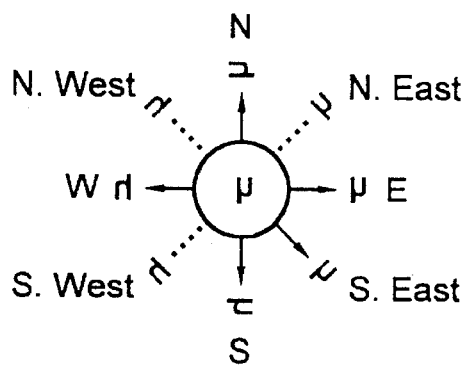
Figure 3D:
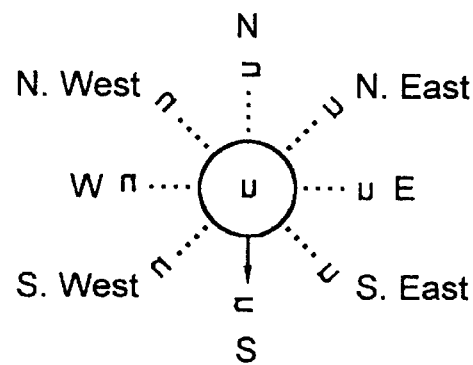
Figure 4A:
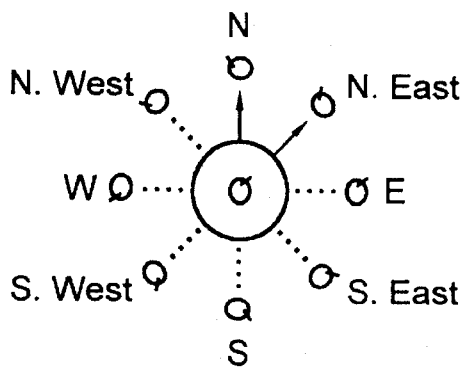
FIGS. 4(a) to 4(d) show the direction postures of 4 inverted small letters ⌐, ⌐, ⌐ and ⌐ in 8 directions, which are used in the inputting method of Chinese characters according to the present invention.
Figure 4B:
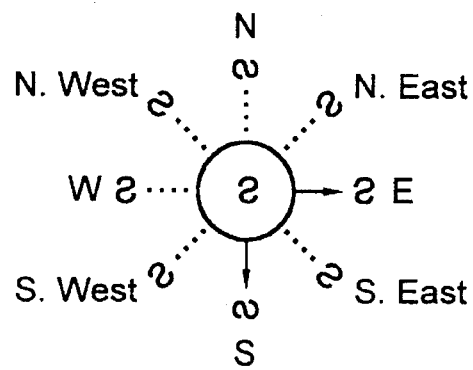
Figure 4C:
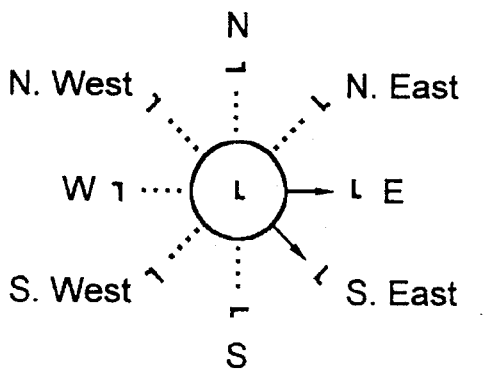
Figure 4D:
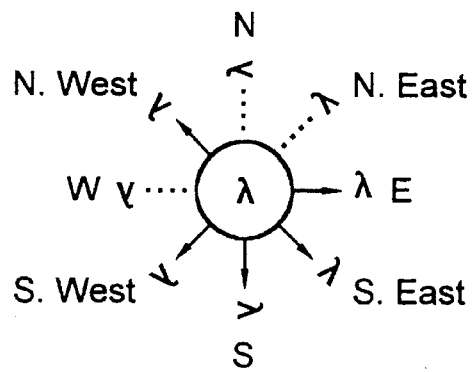

Note: Each of the above characters is a single character, corresponding to either a letter in east direction, or two letters in east direction that composing the character as shown in FIGS. 1(r), 1(x) and 1(u).

(b) Characters of south direction pattern

| Chinese character | Keys on the keyboard | Direction pattern |
|---|---|---|
| 工 | H | south |
| 三 | III | south |

Note: Each of the above characters is a single character, corresponding to either a letter in south direction, or several letters in south direction that composing the character.

(c) Characters of west direction pattern

| Chinese character | Keys on the keyboard | Direction pattern |
|---|---|---|
| ヨ | E | west |

Note: The above character is a single one, corresponding to a letter in west direction.

(d) Characters of north direction pattern

| Chinese character | Keys on the keyboard | Direction pattern |
|---|---|---|
| 山 | E | north |

Note: The above character is a single one, corresponding to a letter in north direction.

(e) Characters of mixed direction pattern

| Chinese character | Keys on the keyboard | Direction pattern |
|---|---|---|
| 岸 | EFX | mixed |

Note: Those characters composed of letters in different directions are called characters of mixed direction pattern. For example, 岸, being a character of mixed direction pattern, is composed of 山 corresponding to "E" in north direction, F corresponding to "F" in east direction, and 十 corresponding to "X" in southeast direction.

(f) Characters of changed and mixed direction pattern

| Chinese character | Keys on the keyboard | Direction pattern |
|---|---|---|
| 江 | FH | changed and mixed |

Note: Those characters consisting of not only letters (positive letters), but also inverted letters in different directions are called characters of changed and mixed direction pattern. For example, 江, being a character of changed and mixed direction pattern, is composed of 氵 corresponding to inverted "F" in northwest direction, and 工 corresponding to "H" in south direction.

5. Detailed examples of inputting characters using letters of English alphabet (a) Encoding single character and inputting method thereof (a1) Characters composed of a single letter Press the key on the keyboard that corresponds to the letter, and then press space bar to end entering. For example 山—press E key and space bar 日—press B key and space bar 人—press Y key and space bar 一—press I key and space bar Note: Bemuse of the great discrete degree which is 26*26= 676, there is no duplicate cede after entering three keys.

(a2) Characters composed of 2 letters

Press each of the keys on the keyboard that correspond to the 2 letters once, and then press space bar once to end entering. For example, 厅—press F, J keys and space bar 叶—press O, X keys and space bar 仝—press A, T keys and space bar 合—press A, O keys and space bar Note: The discrete degree of the characters composed of 2 letters is 26*26*26=17576. Due to the above discrete degree, there is no duplicate code at all after entering four letters.

(a3) Characters composed of 3 letters

Press each of the keys on the keyboard that correspond to the 3 letters once, and then press space bar once to end entering. For example, 全—press A, X, I keys and space bar 晶—press B, B, B keys and space bar 品—press O, O, O keys and space bar 金—press A, X, K keys and space bar Note: The discrete degree of the characters composed of 3 letters is 26*26*26*26=456976. Because the discrete degree is so great, all of the Chinese characters in Chinese Character Set can be encoded. Besides, more than 450 thousand phrases can be encoded.

(a4) Characters composed of 4 letters

Press each of the keys on the keyboard that correspond to the 4 letters one by one. For example, 林—press X, J, X, V keys 齐—press Y, X, J, I keys 乱—press J, X, O, L keys 毕—press F, J, L, X keys Note: The discrete degree of the characters composed of 4 letters is also 456976. There is no duplicate code at all after entering five letters.

(a5) Characters composed of 5 or more letters

Press each of the keys on the keyboard that correspond to the first 3 and the last 1 letters once.

For characters consisting of two characters respectively on the left and on the right:

Select the start and end letters of the left character, as well as the start and end letters of the right character, and then press the keys on the keyboard that correspond to the selected letters. For example, 鞋—press X, X, X, T keys 鱶—press J, K, I, Y keys Note: The start and end letters are marked with solid lines.

For characters consisting of two characters respectively on the top and on the bottom:

Select the start and end letters of the top character, as well as the start and end letters of the bottom character, and then press the keys on the keyboard that correspond to the selected letters. For example, 苹—press F, J, K, I keys 憨—press H, X, J, J keys Note: The start and end letters are marked with solid fines.

For characters consisting of two characters respectively inside and outside:

Select the start and end letters of the outside character, as well as the start and end letters of inside character, and then press the keys on the keyboard that correspond to the selected letter. For example 阄—press I, C, I, F keys 闻—press I, C, K, I keys Note: The start and end letters are marked with solid lines.

In the above three cases, if one of the two characters contained in the character encoded is formed with a single letter, press the first 3 and the last 1 letters of the character. And if the character has less than 4 letters, press space bar to end entering. For example, Characters composed of two characters on the left and on the right:

咯—press O, X, I, O keys

勃—press X, C, J, F keys

Characters composed of two characters on the top and on the bottom:

箭—press E, A, B, J keys

熬—press I, X, R, J keys

The above rule is based upon the constructual features of Chinese characters. Thus, it is advantageous to reduce duplicate codes.

(b) Encoding phrases and inputting method thereof (b1) Phrases consisting of two characters (b11) Two-character phrases composed of two letters:

Press each of the key on the keyboard that correspond to the first and the second letters, and then press space bar to end entering. For example, 工厂—press H, V keys and space bar 七一—press T, I keys and space bar (b12) Two-character phrases composed of three letters:

Press the keys on the keyboard that correspond to the three letters, and then press space bar. For example, 当日—press E, E, B keys and space bar 山冈—press E, C, X keys and space bar (b13) Two-character phrases composed of four letters:

Press the keys on the keyboard that correspond to the four letters. For example, 丫头—press Y, J, Y, R keys 立功—press Y, K, H, F keys (b14) Two-character phrases composed of five or more letters:

If any one of the two characters of said phrase is composed of a single letter, select the first 3 and the last 1 letters, and press the keys on the keyboard that correspond to the selected letters one by one. For example, 时日—press B, F, J, B keys 日食—press B, K, E, Y keys If both of the two characters consist of two or more letters, select the start and the end letters of the first character, and the start and the end letters of the second character, and press the keys on the keyboard that correspond to the selected letters one by one. For example, 美金—press K, R, A, K keys 轻巧—press T, H, H, S keys (b2) Phrases consisting of three characters Press each of the keys on the keyboard that correspond to the start letters of the three characters, and then if the last character consists of a single letter, press space bar once to end entering, otherwise press the key on the keyboard that corresponds to the end letter of the last character. For examples, 开夜车—press I, Y, T, X keys 中国人—press O, U, R keys and space bar (b3) Phrases consisting of four characters Press each of the keys on the keyboard that correspond to the start letters of the four characters one by one. For example, 商品经济—press Y, O, W, F keys 热火朝天—press F, V, X, I keys (b4) Phrases consisting of five or more characters Select the start letters of the first 3 and the last 1 characters, and then press each of the keys on the keyboard that correspond to the selected letters. For example 诺贝尔奖金—press J, U, H, A keys 百闻不如一见—press R, I, K, U keys 中华人民共和国—press O, K, R, U keys 百尺竿头更进一步—press R, R, K, T keys The present invention is not limited to the particular embodiments described above. Various changes and modifications may be made without departing the scope of the appended claims.

What is claimed is:

1. A method of encoding and inputting Chinese characters into computers, through a standard English keyboard, each Chinese character being composed of one or more strokes written in an order of traditional Chinese calligraphy wherein initial strokes are classified into four types of horizontal stroke ___, vertical stroke |, left-slanting stroke ╱, and right-slanting stroke ╲, said method comprising the steps of:

(A) constructing predetermined English letters with the initial strokes;

(B) decomposing Chinese characters into combinations of the predetermined English letters and inverted English letters which are respectively allocated on each key of the keyboard in eight positional directions of EAST, SOUTHEAST, SOUTH, SOUTHWEST, WEST, NORTHWEST, NORTH, and NORTHEAST, and posted respectively thereon as being spun about the center of the key, said predetermined English letters and inverted English letters including twenty-six capital English letters, eight small English letters of b, f, g, h, i, r, t, and y, four inverted capital letters of ⊢, Ɔ, Ø, and ƨ inverted respectfully from F, G, Q and S, and four inverted small letters of ɥ, ʉ, ⌐ and ⋋ inverted respectively from h, n, r, and y;

(C) denoting each of said posted letters in said combinations composing said Chinese characters with a corresponding English letter, thereby forming codes of said Chinese characters; and (D) inputting said codes of said Chinese characters into the computer through the keyboard.

2. The method according to claim 1, wherein if a single Chinese character is input, said step of inputting said codes comprises, if said codes of said single Chinese character are composed of less than five English letters, inputting said less than five English letters through said keyboard; otherwise, inputting first three letters and the last letter of said codes of said single Chinese character through said keyboard if said codes of said Chinese character are composed of five or more English letters; and wherein if a single Chinese character itself consists of first and second characters and has codes of five or more English letters, said step of inputting said codes comprises, if codes of said first character or codes of said second character are composed of a single English letter, inputting the first three English letters and the last English letter of said codes of said single Chinese character through said keyboard, otherwise, inputting the start and the end English letters of said codes of said first character, and the start and the end English letters of said codes of said second character through said keyboard if any of said codes of said first and second character of said single Chinese character has more than one English letter.

3. The method according to claim 1, wherein for a Chinese phrase consisting of a plurality of Chinese characters, said step of inputting said codes of said Chinese characters comprises:

(a) if codes of first and second Chinese characters of a Chinese phrase consisting of two Chinese characters are composed of less than five English letters, inputting said less than five English letters through said keyboard, and if said codes of said phrase are composed of five or more letters and any codes of said first Chinese character and said second Chinese character are composed of a single English letter, inputting first three English letters and the last English letter of said codes of said Chinese phrase through said keyboard, wherein if both codes of said first Chinese character and said second Chinese character are composed of two or more English letters, inputting the start and the end English letters of said codes of said first Chinese character, and the start and the end English letters of said codes of said second Chinese character;

(b) for a Chinese phrase consisting of three Chinese characters, inputting the start English letters of codes of each of said three Chinese characters through said keyboard;

(c) for a Chinese phrase consisting of four Chinese characters, inputting the start English letters of codes of each of said four Chinese characters through said keyboard; or (d) for a Chinese phrase consisting of five or more Chinese characters, inputting the start English letters of codes of each of first three Chinese characters and the last character through said keyboard.

4. The method according to claim 1, wherein each predetermined English letter is composed of as many initial strokes as possible before the step of decomposing Chinese characters into combination of the predetermined English letters and inverted English letters.

5. The method according to claim 2, wherein a space bar of said keyboard is pressed when said codes of said single Chinese character are composed of less than four English letters to delimit codes of one Chinese character from codes of other Chinese characters.

6. The method according to claim 3, wherein a space bar of said keyboard is pressed when said codes of said Chinese phrase are composed of less than four English letters to delimit codes of one Chinese phrase from codes of other Chinese characters.

* * * * *